US009232157B2

(12) United States Patent
Willis et al.

(10) Patent No.: US 9,232,157 B2
(45) Date of Patent: Jan. 5, 2016

(54) APPARATUS, SYSTEM AND METHOD FOR ELECTRONIC MOTION DETECTION

(71) Applicants: Clayton D. Willis, Seagoville, TX (US);
Jeremy D. Willis, Forney, TX (US);
Darrel G. Walker, Richardson, TX (US)

(72) Inventors: Clayton D. Willis, Seagoville, TX (US);
Jeremy D. Willis, Forney, TX (US);
Darrel G. Walker, Richardson, TX (US)

(73) Assignee: Clayton D. Willis, Seagoville, TX (US)

( * ) Notice: Subject to any disclaimer, the term of this patent is extended or adjusted under 35 U.S.C. 154(b) by 422 days.

(21) Appl. No.: 13/740,579

(22) Filed: Jan. 14, 2013

(65) Prior Publication Data

US 2013/0182115 A1    Jul. 18, 2013

Related U.S. Application Data

(60) Provisional application No. 61/585,845, filed on Jan. 12, 2012.

(51) Int. Cl.
*H04N 5/33*     (2006.01)
*G08B 13/189*   (2006.01)
*G08B 13/194*   (2006.01)
*H04Q 9/00*     (2006.01)

(52) U.S. Cl.
CPC ............... *H04N 5/33* (2013.01); *G08B 13/189* (2013.01); *G08B 13/194* (2013.01); *H04Q 9/00* (2013.01); *H04Q 2209/823* (2013.01)

(58) Field of Classification Search
CPC .... G08B 13/19; G08B 13/189; G08B 13/194; G08B 13/19641; G08B 13/19645; G08B 13/19682
USPC ........... 340/545.2, 545.3, 553–556, 565–567, 340/541
See application file for complete search history.

(56) References Cited

U.S. PATENT DOCUMENTS

| 3,525,978 | A |   | 8/1970  | Heinecke et al. |
|-----------|---|---|---------|-----------------|
| 4,064,825 | A |   | 12/1977 | Sly             |
| 5,448,320 | A | * | 9/1995  | Sakai et al. .................... 396/427 |
| 6,118,375 | A |   | 9/2000  | Duncan          |
| 6,259,365 | B1|   | 7/2001  | Hagar           |
| 6,624,609 | B2|   | 9/2003  | Allen           |
| 6,650,239 | B1|   | 11/2003 | Hron            |
| 6,806,811 | B1|   | 10/2004 | Readler         |
| 2002/0044054 | A1| * | 4/2002 | Krubiner et al. ........... 340/545.3 |

(Continued)

OTHER PUBLICATIONS

D & D Security Products. "Products to protect yourself while camping in the great outdoors." http://www.ddsp.com/campsafe.htm. Web. Oct. 24, 2011.

*Primary Examiner* — Steven Lim
*Assistant Examiner* — Hongmin Fan
(74) *Attorney, Agent, or Firm* — Scott T. Griggs; Griggs Bergen LLP

(57) ABSTRACT

An apparatus, system and method for electronic motion detection are disclosed. Passive infrared sensor clusters are mounted in spaced, forward facing positions within a housing and include a left binocular plurality of passive infrared sensors and a right binocular plurality of passive infrared sensors. These passive infrared sensor clusters define respective left and right overlapping fields of view having the same horizontal elevation with a horizontal spacing being adjustable therebetween. Detection circuitry processes respective detection signals relative to an intruder received from the left and right binocular plurality of passive infrared sensors to eliminate false positive signals and classify the intruder as one of moving left to right, right to left, and stationary.

6 Claims, 4 Drawing Sheets

(56) References Cited

U.S. PATENT DOCUMENTS

| | | | |
|---|---|---|---|
| 2003/0234347 A1* | 12/2003 | Akagi | 250/221 |
| 2004/0156266 A1* | 8/2004 | McDonald | 367/136 |
| 2006/0173349 A1* | 8/2006 | Chien | 600/466 |
| 2006/0251259 A1* | 11/2006 | Renkis | 380/270 |
| 2007/0298772 A1* | 12/2007 | Owens et al. | 455/414.1 |
| 2008/0036595 A1* | 2/2008 | Hollstien et al. | 340/541 |
| 2008/0042824 A1* | 2/2008 | Kates | 340/522 |
| 2008/0079567 A1 | 4/2008 | Poor | |
| 2010/0194565 A1* | 8/2010 | Houston | 340/556 |
| 2011/0012734 A1 | 1/2011 | Reese et al. | |
| 2011/0118608 A1* | 5/2011 | Lindner et al. | 600/474 |

* cited by examiner

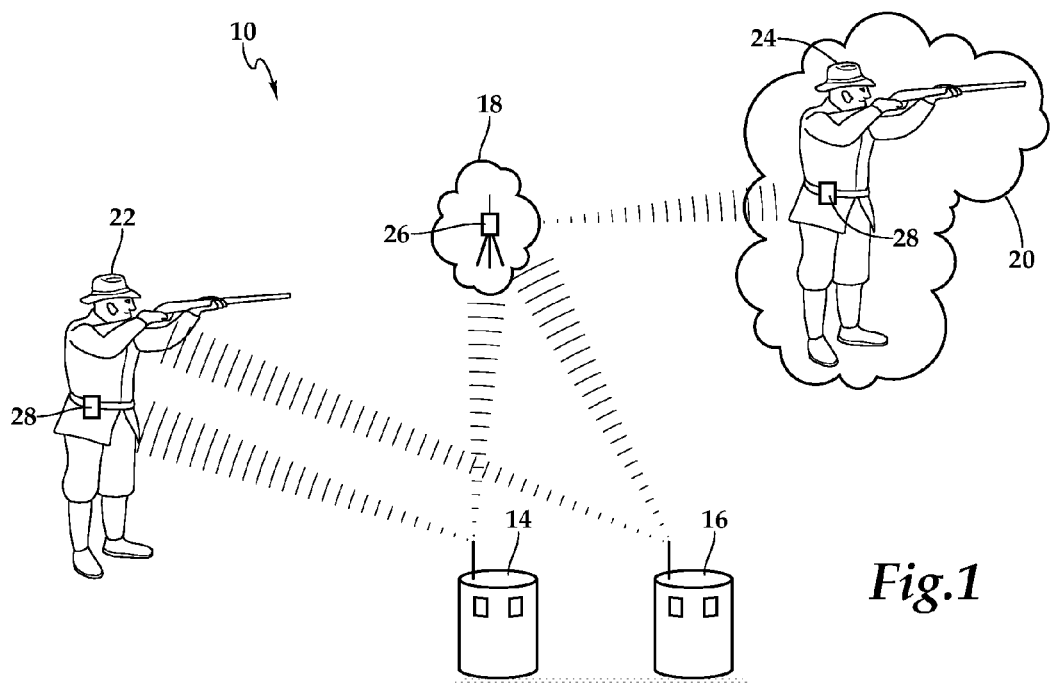
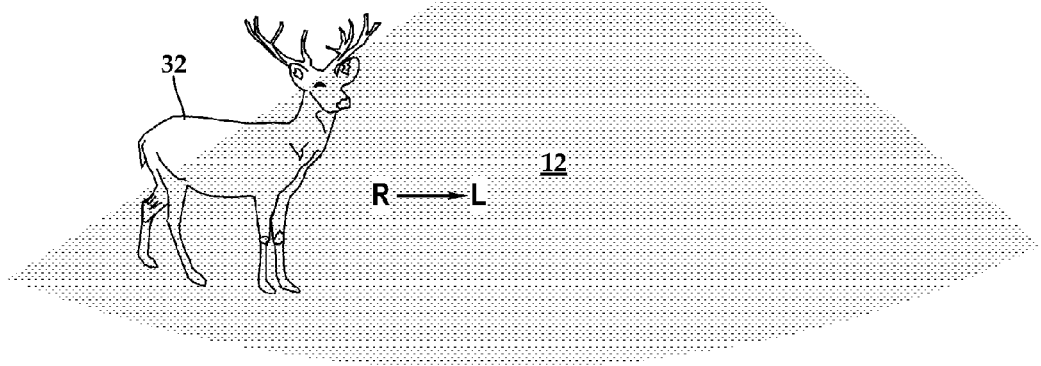
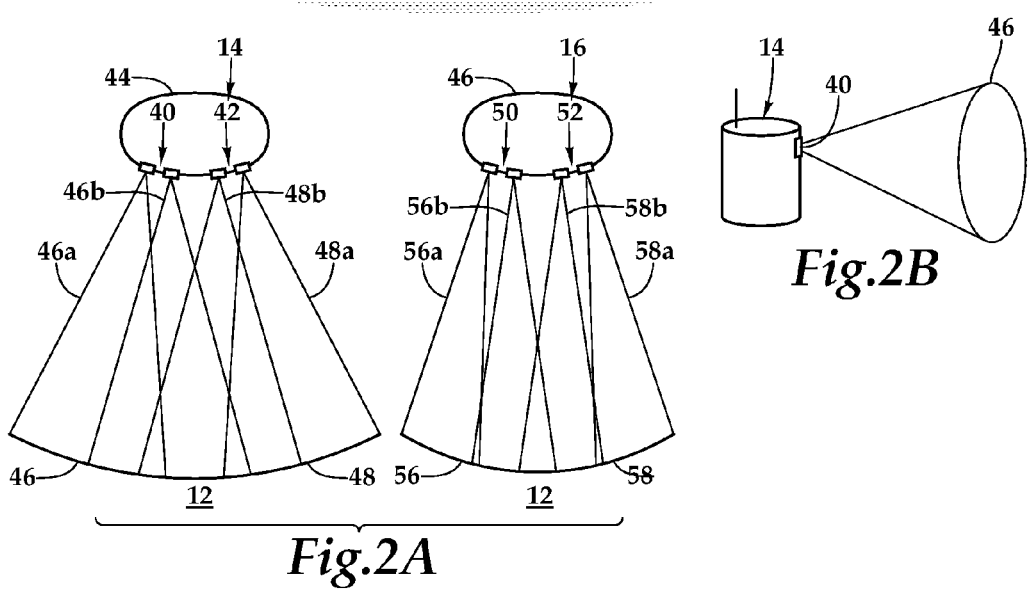
*Fig.1*
*Fig.2B*
*Fig.2A*

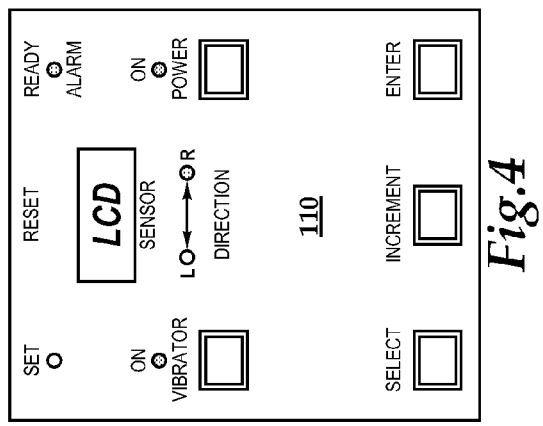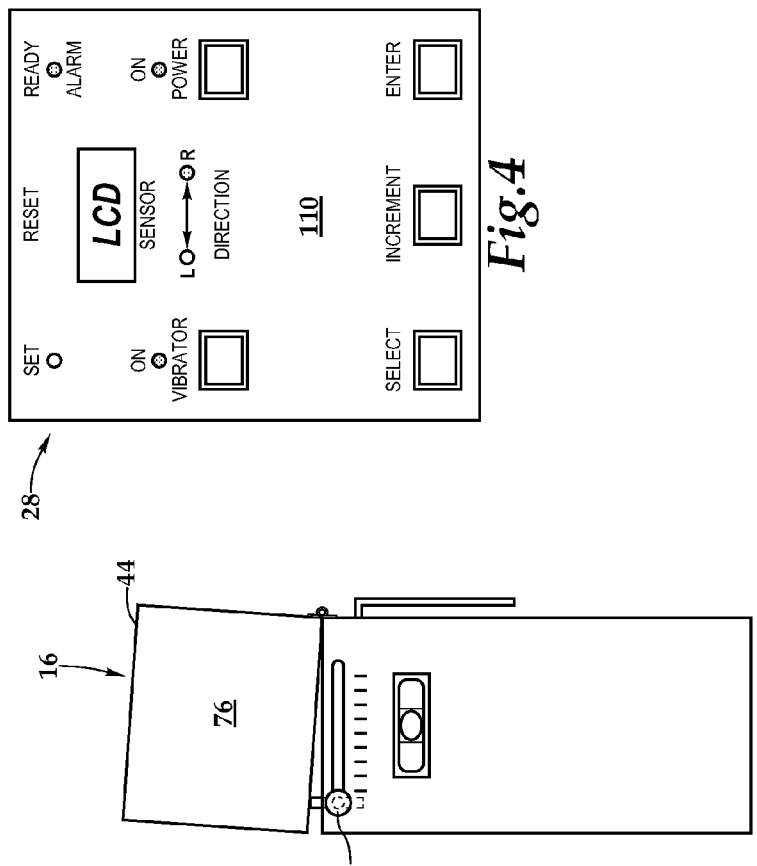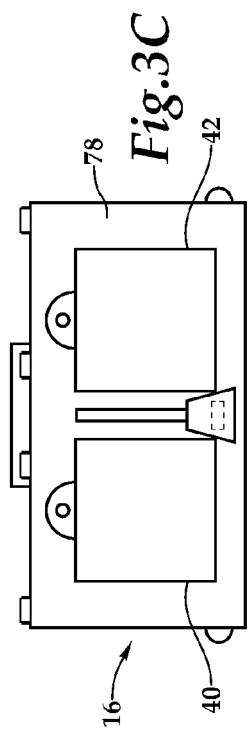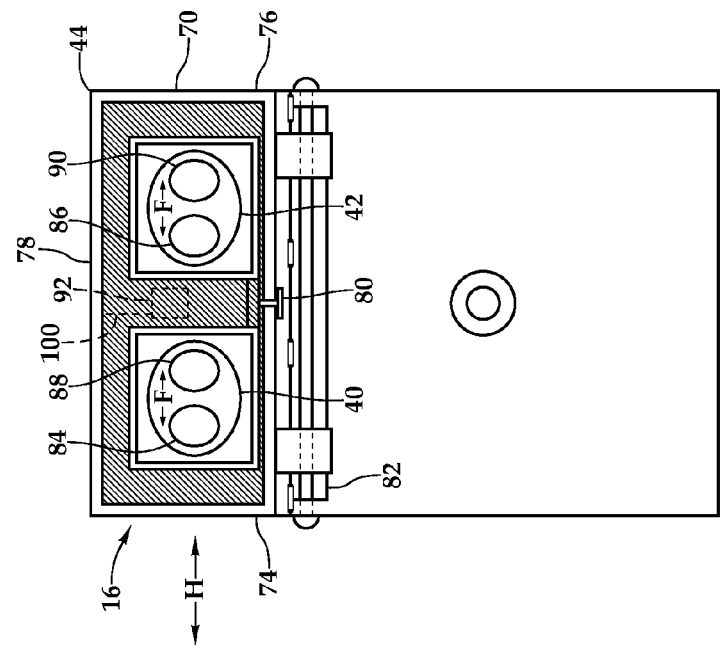

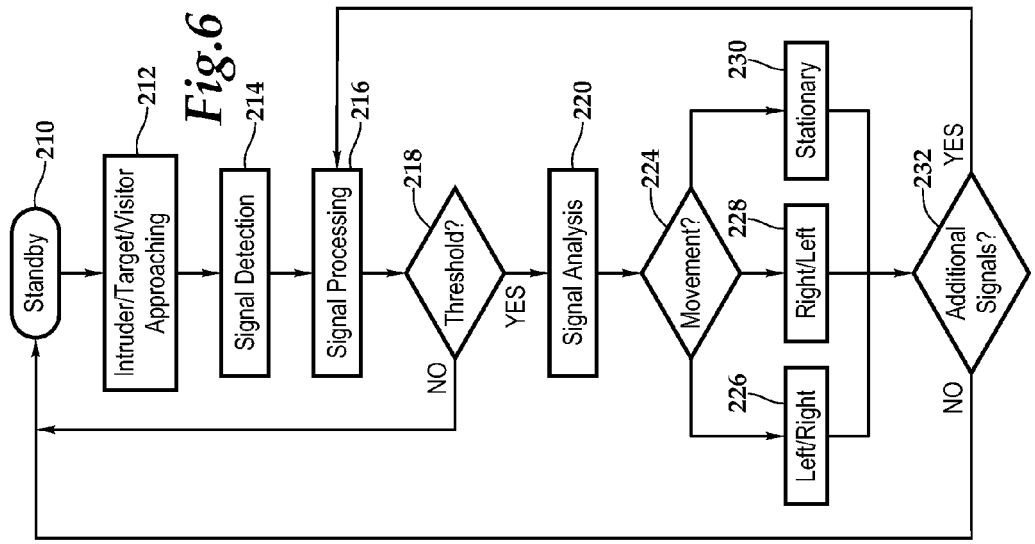
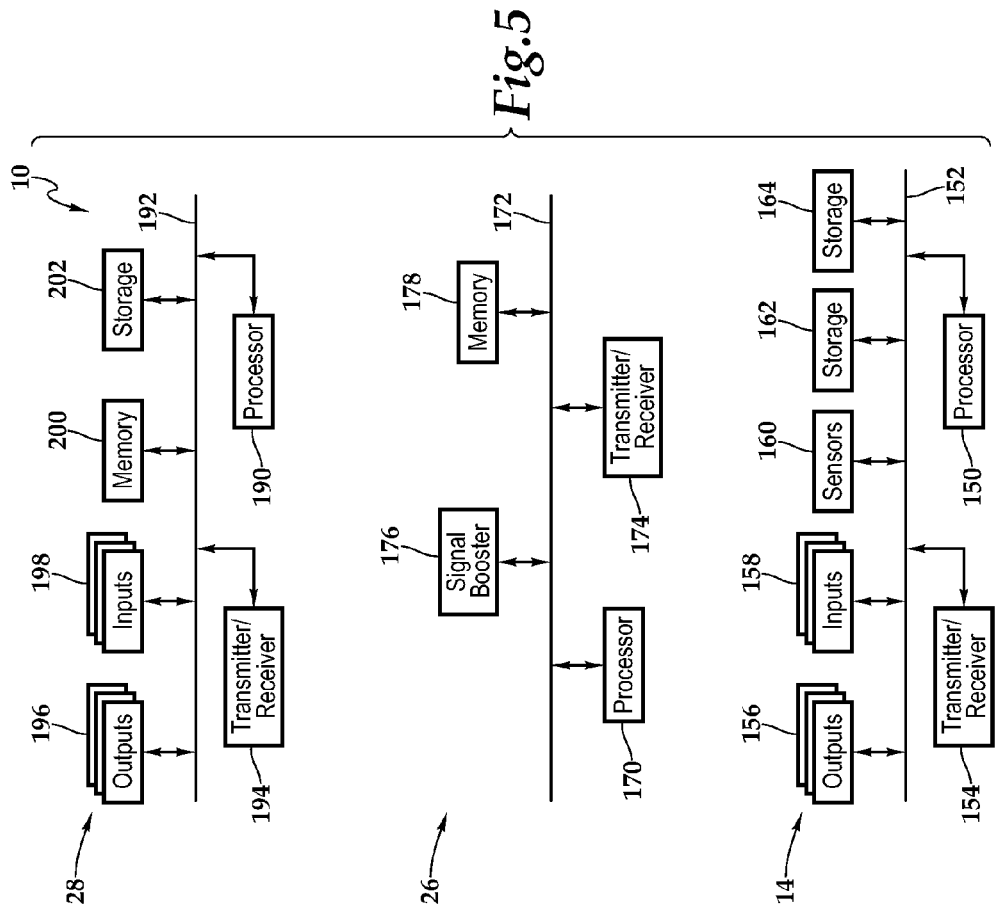

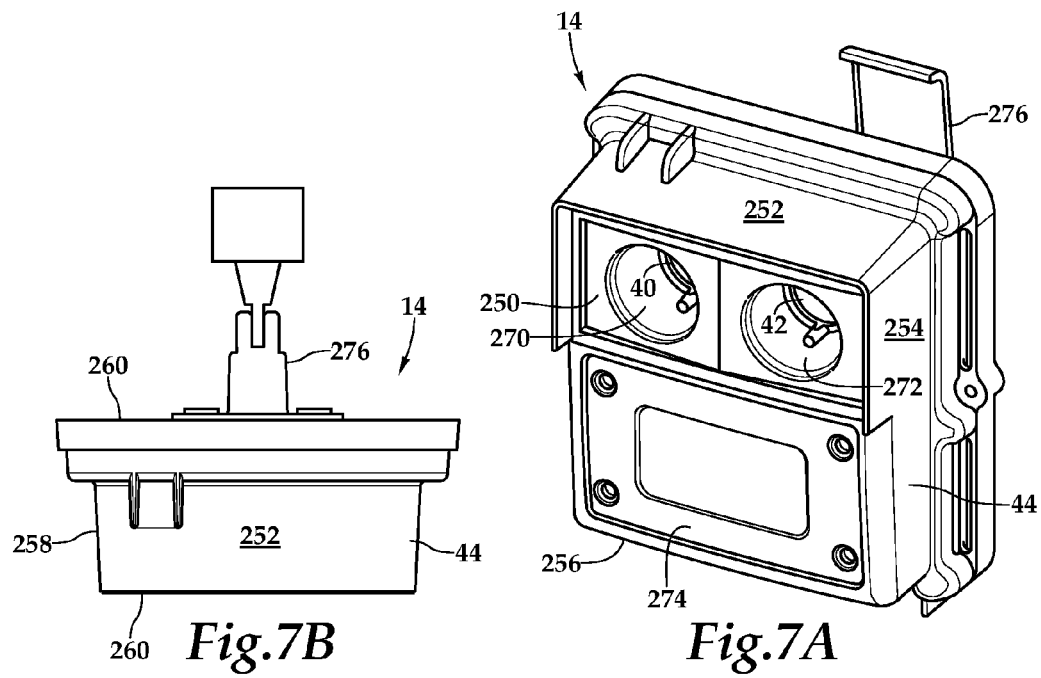
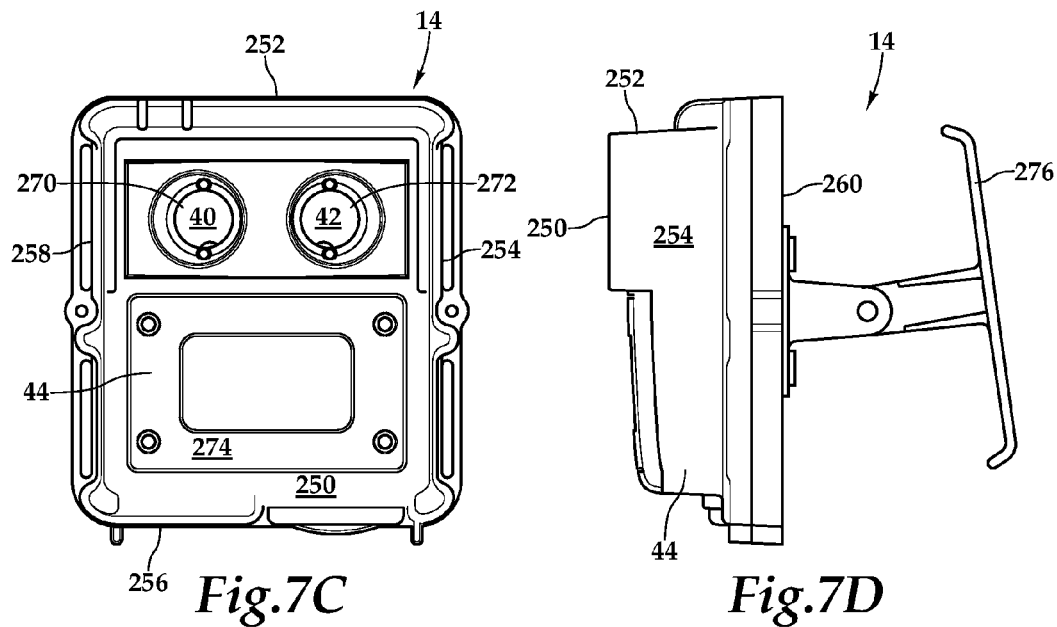

APPARATUS, SYSTEM AND METHOD FOR ELECTRONIC MOTION DETECTION

PRIORITY STATEMENT & CROSS-REFERENCE TO RELATED APPLICATIONS

This application claims priority from U.S. Patent Application No. 61/585,845, entitled "Apparatus, System and Method for Electronic Motion Detection" and filed on Jan. 12, 2012 in the names of Clayton D. Willis, Jeremy D. Willis and Darrel G. Walker; which is hereby incorporated by reference for all purposes.

TECHNICAL FIELD OF THE INVENTION

This invention relates, in general, to portable detection systems and, in particular, to apparatuses, systems, and methods for electronic motion detection for use during camping and hunting, among other applications, including monitoring remote properties such as barns and home and business security applications.

BACKGROUND OF THE INVENTION

Without limiting the scope of the present invention, its background will be described with reference to outdoor activities. Recreational activities, such as camping and hunting, afford a person an opportunity to escape the hustle and bustle of everyday life and enjoy nature. Being alerted to the intrusion of a two legged or four-legged visitor is essential, whether to avoid surprise during camping or being alerted to the approach of wild game when hunting. Early warning of the arrival or approach of the two legged or four-legged visitor may provide sufficient time for the outdoors man or woman to take appropriate action. Further improvements are warranted in this field.

SUMMARY OF THE INVENTION

It would be advantageous to achieve an electronic motion detection apparatus that would ensure the accuracy in identifying an approaching two or four legged visitor. It would also be desirable to enable an electromechanical solution that minimizes the number of false alarms as well as provide additional data about the identify of an approaching two or four legged visitor. To better address one or more of these concerns, in one aspect of the invention, an apparatus, system and method for electronic motion detection are disclosed. In one embodiment of the apparatus, first and second passive infrared sensor clusters are mounted in spaced, forward facing positions within a housing. Each of the first and second passive infrared sensor clusters includes a left binocular plurality of passive infrared sensors and a right binocular plurality of passive infrared sensors.

These passive infrared sensor clusters define respective left and right overlapping fields of view having the same horizontal elevation with a horizontal spacing being adjustable therebetween. Detection circuitry processes respective detection signals relative to an intruder received from the left and right binocular plurality of passive infrared sensors of each of the first and second passive infrared sensor clusters to eliminate false positive signals and classify the intruder as one of moving left to right, right to left, and stationary. These and other aspects of the invention will be apparent from and elucidated with reference to the described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram of one embodiment of a system, including multiple apparatuses, for electronic motion detection being deployed in an outdoor environment;

FIG. 2A is a top plan view of one embodiment of multiple apparatuses for electronic motion detection being utilized in the outdoor environment of FIG. 1;

FIG. 2B is a side elevation view of the multiple apparatuses depicted in FIG. 2A;

FIG. 3A is a front elevation view of one embodiment of an apparatus for electronic motion detection depicted in FIG. 1;

FIG. 3B is a side elevation view of the apparatus of FIG. 3A;

FIG. 3C is an interior top plan elevation of the apparatus of FIG. 3A;

FIG. 4 is a front elevation view of one embodiment of a panel utilized with the monitoring device depicted in FIG. 1;

FIG. 5 depicts a schematic block diagram of one embodiment of the electronics of the system depicted in FIG. 1;

FIG. 6 depicts a flow chart illustrating one embodiment of a method for electronic motion detection;

FIG. 7A is a front perspective view of another embodiment of an apparatus for electronic motion detection depicted in FIG. 1;

FIG. 7B is a top plan view of the apparatus of FIG. 7A;

FIG. 7C is a front elevation view of the apparatus of FIG. 7A; and

FIG. 7D is a side elevation view of the apparatus of FIG. 7A.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted a system for electronic motion detection that is schematically illustrated and generally designated 10 and being utilized at entry zone 12 where electronic motion apparatuses 14, 16 are located. Further, remote locations 18, 20 are depicted. An individual 22 is located proximate to the entry zone 12 and is employing the system for electronic motion detection 10 to monitor the entry zone 12. Similarly, an individual 24 is located at remote location 20 and is utilizing the system 10 to monitor entry zone 12 by way of a repeater 26 located at remote location 18, which is intermediate to the entry zone 12 and the remote location 20. The repeater 26 is disposed in wireless communication with the apparatuses 14, 16. The individuals 24, monitor the entry point 12 using the system 10 with monitoring devices 28 and 30, which wirelessly communicate with the apparatuses 14, 16 and/or the repeater 26.

In this example, the monitoring device 28 wirelessly communicates directly with the apparatuses 14, 16 and the monitoring device 30 communicates wirelessly with the apparatuses 14, 16 by way of the repeater 26. In one implementation, as will be discussed in further detail hereinbelow, the monitoring devices 28, 30 may be any combination of hardware and software, ranging, for example, from a vibrator to an application for a wireless mobile device such as a cell phone. Further, the apparatuses 14, 16 may use any form of wireless, including cellular, protocol. It should be appreciated that although two apparatuses 14, 16 are being utilized, any number of apparatuses may be deployed. Further, in instances with multiple apparatuses, a single apparatus may be designated as the gateway device for communicating with any repeaters and monitoring devices. Moreover, although by way of non-limiting example, the system 10 is depicted as being used in an outdoor environment, the system 10 presented herein is suited for other types of environments, including camping grounds, homes, businesses, schools, parks, and public spaces, for example.

In operation, a deer 32 approaches the entry zone 12 and the apparatuses 14, 16 are actuated by the motion of the deer 32. The apparatuses 14, 16 eliminate false positive signals and classify the intruder, i.e., the deer 32, as one of moving left to right, right to left, and/or stationary. More generally, however, the apparatuses may determine the direction of movement or stationary position of the deer 32 with respect to one or more of the apparatuses 14, 16. As shown, in the present example, the apparatuses 14, 16 identify the deer as moving from the right to left with respect to the apparatuses 14, 16. A wireless signal is then sent from the apparatuses 14, 16 to the monitoring device 28 and the monitoring device 30 by way of the repeater 26. The monitoring devices 28, 30 respectfully provide notification to the individuals 22, 24 of the presence of the deer 32 and the direction of movement.

With respect to the detection, more particularly, with reference to FIGS. 2A and 2B, in one embodiment, apparatus 14 includes passive infrared sensor clusters 40, 42 mounted in spaced, forward facing positions within a housing 44. The passive infrared sensor clusters 40, 42 define respective left and right overlapping fields of view, such as cones 46, 48, having the same horizontal elevation with, in one embodiment, a horizontal spacing being adjustable therebetween. Each of the passive infrared sensor clusters 40, 42 include left and right binocular sensors which each provide left and right overlapping fields of view 46a, 46b, 48a, 48b. Therefore, double-fractal-binocularity is provided at the apparatus 14 with a left-right field within a left-right field. Similarly, apparatus 16 includes passive infrared sensor clusters 50, 52 within a housing 46 to define cones 56, 58 including double-fractal-binocularity with fields 56a, 56b, 58a, 58b. The double-fractal-binocularity furnished by the four overlapping fields of detection 46a, 46b, 48a, 48b (per apparatus) provides for not only monitoring of a target's presence, but directional awareness of the target as well by employing a sequentially-actuatable sensor set with overlapping fields of view. As discussed, each of the apparatuses 14, 16 processes respective detection signals relative to an intruder, such as the deer 32, received from the passive infrared sensor clusters 40, 42, 50, and fields 46a, 46b, 48a, 48b, 56a, 56b, 58a, 58b to eliminate false positive signals and classify the intruder, e.g., deer 32, as one of moving left to right, right to left, and stationary.

Referring now to FIGS. 3A through 3C, the apparatus for electronic motion detection 16, which may be considered a type of sensor transmitter module, includes the housing 44 with a front panel 70, rear panel 72, side panels 74, 76, a top 78, and a bottom (not shown). The first and second passive infrared sensor clusters 40, 42 are mounted in spaced, forward facing positions within the housing 44 on the front panel 70. The first and second passive inferred sensor clusters are aligned in the same horizontal plane, H. A span adjustment member 80 is located within the housing 44 and interposed between the first and second passive infrared sensor clusters 40, 42. As will be discussed further, in one embodiment, the horizontal distance may be fixed. The adjustment member 80 is configured to adjust the horizontal spacing between the first and second passive infrared sensor clusters 40, 42 in order to provide a variable binocular disparity between the first and second passive infrared sensor clusters 40, 42. An elevation adjustment member 82 is also located within the housing 44 and at least partially supports the first and second passive infrared sensor clusters 40, 42. The elevation adjustment member 82 is configured to adjust the elevation of the first and second passive infrared sensor clusters 40, 42. As will be discussed further, in one embodiment, the elevation may be fixed.

Each of the passive infrared sensor clusters 40, 42 includes a left binocular plurality of passive infrared sensors 84, 86 and a right binocular plurality of passive infrared sensors 88, 90. The left and right binocular pluralities, respectively 84 and 88 and 86 and 90, are separated by a fixed distance, F, in order to provide fixed binocular disparity. Moreover, the first and second passive infrared sensor clusters 40, 42 define respective left and right overlapping fields of view.

Detection circuitry 92 is located within the housing 44 and communicatively disposed with the passive infrared sensor clusters 40, 42. The detection circuitry 92 processes respective detection signals relative to an intruder, which may be a target or visitor, for example, received from the left and right binocular plurality of passive infrared sensors 84-90 of each of the first and second passive infrared sensor clusters 40, 42. The detection circuitry 92 processes each of the detection signals from the left and right binocular plurality of passive infrared sensors 84-90 against a predetermined threshold to categorize a portion of the detection signals as active detection signals. The detection circuitry 92 processes the active detection signals to classify the intruder as one of moving left to right, right to left, and stationary.

Thermal imaging sensors and thermopile temperature sensors may be used to detect temperature. In an embodiment using the thermal imaging sensors, a thermal imaging profile may be developed and compared to a database of images to associate an animal with the intruder based on the temperature readings. In the thermopile implementation, a temperature reading may be made and compared to a threshold to determine if the reading is a false positive (e.g., moving brush or other inanimate object) or an animal giving off a certain minimal amount of heat. In another embodiment, ultrasound detection is included to determine distance. A visible light may be mounted in the housing in the forward facing direction to provide a guidance tracer light for alignment use during application of the span adjustment member and the elevation adjustment member. In an alternative embodiment, one or more spirit levels or bubble levels may be mounted in the housing, or otherwise associated therewith, to indicate during manual adjustment whether the span adjustment member and elevation adjustment member are positioning the housing horizontal (level) and/or vertical (plumb).

An antenna 100 is associated with the housing 44 by mounting or other technique and positioned in communication with the detection circuitry 92 in order to send wireless detection signals to a receiver vibrator module and/or a repeater module. Using various deployments of the apparatus module, repeater modules, and receiver vibrator modules, a meshed network may be provided having an increased area of coverage.

FIG. 4 displays panel 110 of the monitoring device wherein one embodiment of a presentation of indicators and controls is presented for a remote monitoring device. A SET indicator, which may be considered a PROGRAM indicator, upon illumination, sets the monitoring device to be in a mode of operation wherein an apparatus address may be entered. Additionally, if the unit is receiving the data from another monitoring device, the sending monitoring device may download the unique factory programmed address plus all sensor numbers to the receiving monitoring device. The receiving monitoring device will then respond to all network sensor transmitter modules or electronic monitoring apparatuses as if it was the original programmed monitoring device, i.e. it is a clone of the original. This provides for multiple remote monitoring devices on the same network of electronic monitoring devices. As shown, an LCD module can display numbers to assist in the programming of the monitoring device. For example, if the numbers of electronic monitoring apparatuses is three, it will respond to and display numbers 1, 2, 3 . . . n to assist with programming.

A RESET indicator when illumination, indicates that a monitoring device was cloned to emulate another monitoring device, a reset to factory defaults may be achieved by pressing ENTER. This also provides a quick means to clear a monitoring device of all programmed data in order to set up a new network. The READY-ALARM indicator upon the LED being illuminated green indicates that the RVM is not in the SET or RESET mode, but it is ready to monitor signals from network electronic monitoring devices. The VIBRATOR indicator is an LED that if illuminated indicates that the vibrator is turned on, and it will vibrate if an apparatus reports activity. The POWER indicator is an LED that when illuminated indicates that the unit is turned on. The DIRECTION indicators are LEDs that illuminate to indicate the direction an object is moving in relation to the STM.

A VIBRATOR switch is a push button switch used to enable/disable the vibrator. A POWER switch is a push button switch used to turn the RVM power ON/OFF. A SELECT switch is a mode select switch. The first push from READY will turn the READY LED off and the SET LED on. The next push will turn SET off and RESET on, and the third push will turn RESET off and READY on. The INCREMENT switch is a monitoring device where if the monitoring device is in the SET mode, each push of this switch will advance the sensor number to be programmed into a receiving an electronic monitoring apparatus. The ENTER switch is a switch whereby depressing this switch will send address data from a RVM to a STM if the RVM is in the SET mode. If the RVM is in the SET mode, and if the receiving unit is another RVM, the receiving RVM will be cloned to emulate the sending RVM. If a RVM is in the RESET mode, it is restored to factory default values when ENTER is depressed. The VIBRATOR and POWER switches will be large enough to allow finger operation, but will not be accessible enough to provide accidental changes in operation. The SELECT, INCREMENT, and ENTER switches are only used to set up a network. Therefore, they will be recessed and require a small object such as a paper clip or ballpoint pin to push the switch. It should be appreciated that although a particular design and architecture of a monitoring device is shown, other designs and architectures are within the teachings disclosed herein.

FIG. 5 depicts one embodiment of the system 10 in which the system for electronic monitoring is schematically depicted to include a computer-based architecture having an electronic monitoring apparatus 14, a repeater 26, and a monitoring device 28. With respect to the electronic monitoring apparatus 14, the architecture includes a processor 150 coupled to a bus 152 having transmitter/receiver circuitry 154, general outputs 156, general inputs 158, sensor inputs 160, memory 162, and storage 164 interconnected therewith. The memory includes processor-executable instructions that, when executed cause the processor to execute instructions for the electronic monitoring of the entry zone 12. By way of example, and not by way of limitation, the instructions may be directed to receiving detection signals, validating the detection signals, and processing the detection signals to determine the stationary position or movement of an intruder or target. By way of further example, the instructions may specify detection validity of a detection signal at a first time, $t_1$, based on the functional values of the detection signals as logical expressions with functional arguments, e.g., a truth table.

Additionally, the instructions include specifying detection validity at a second time, $t_2$, based on the functional values of the detection signals as logical expressions with functional arguments. As previously discussed, each electronic monitoring apparatus includes two sensor clusters having variable or fixed binocular disparity and within each of the two sensor clusters two sensor sets having fixed binocular disparity. In this manner, double-fractal-binocularity is provided. Accordingly, in this embodiment, for each electronic monitoring apparatus, the sensor analysis includes the analysis of at least four sensors. This analysis may be embodied in a truth table or equivalent. An example of a truth table for Determining Signal Validity is found in Table I.

TABLE I

Signal Validity Table

| Sensor Pattern | Sensor 1, Left | Sensor 1, right | Sensor 2, left | Sensor 2, right | Detection Validity |
|---|---|---|---|---|---|
| 1 | 0 | 0 | 0 | 0 | No activity |
| 2 | 0 | 0 | 0 | 1 | *1 Bad |
| 3 | 0 | 0 | 1 | 0 | *1 Bad |
| 4 | 0 | 0 | 1 | 1 | *2 Fair |
| 5 | 0 | 1 | 0 | 0 | *1 Bad |
| 6 | 0 | 1 | 0 | 1 | *3 Good |
| 7 | 0 | 1 | 1 | 0 | *2 Fair |
| 8 | 0 | 1 | 1 | 1 | Excellent |
| 9 | 1 | 0 | 0 | 0 | *1 Bad |
| 10 | 1 | 0 | 0 | 1 | *3 Good |
| 11 | 1 | 0 | 1 | 0 | *3 Good |
| 12 | 1 | 0 | 1 | 1 | Excellent |
| 13 | 1 | 1 | 0 | 0 | *2 Fair |
| 14 | 1 | 1 | 0 | 1 | Excellent |
| 15 | 1 | 1 | 1 | 0 | Excellent |
| 16 | 1 | 1 | 1 | 1 | Excellent |

Wherein in Table I, a value of 1 = sensor detection and wherein:
*1 Bad is most likely a false disturbance.
*2 Fair is when the two elements of the same sensor are the only elements reporting activity, or when sensor 1, right element and sensor 2, left element are the only reporting elements. These two elements may share the same field of view depending on the setup.
*3 Good is when one element from each sensor detects motion except as described in *2. An animal running/jumping might produce this pattern.

An excellent rating may occur when three or four sensor elements detect movement. This is the normal condition for an animal moving in the field of view at a normal speed.

Following the determination of signal validity, the processor-executable instructions may continue by comparing detection validity at the first time, $t_1$, and detection validity at the second time, $t_2$, to identify direction of movement. Continuing with the example illustrated in Table I, each of the four sensor element circuits drives a different interrupt on the processor, which may be a microcontroller, for example. When an interrupt occurs, the four inputs are read and saved as the first read in a table. The processor then sets a timer and continues to read the sensor inputs. If an input change is detected, it is added to the table of values, and then timer is refreshed. This process continues until a pattern is accumulated, or the timer times out due to no activity. After each input change, the table values are logically ORed together to detect if a pattern has been attained.

By way of example, if three or four sensors have reported activity, the first input read is analyzed to determine direction of travel. A value of 1000, 01000, or 1100 indicates a left to right movement in the field of view proximate to the entry zone. A value of 0001, 0010, or 0011 indicates a right to left movement. With respect to time, the detection of a left to right movement or a right to left movement followed by not detection signals indicates the intruder or visitor is stationary in the field of view proximate to the entry zone. Following the determination of the direction of movement, instructions are specified for indicating the direction of movement on a display associated with the electronic monitoring device or instructions for wirelessly transmitting data to monitoring devices to provide an indication of the direction of movement.

With respect to the repeater 26, a processor 170 is coupled to a bus 172 having transmitter/receiver circuitry 174, signal strength increasing circuitry 176, and memory 178 interconnected therewith. The monitoring device includes a processor 190 coupled to a bus 192 having transmitter/receiver circuitry 194, outputs 196, inputs 198, memory 200 and storage 202 interconnected therewith. The monitoring device processes data received wirelessly relative to the detection signals and may provide a visual indication by way of the outputs, to include, for example, an LED indicator or display. Alternatively, an audio indicator may be provided or a tactile indication by way of a vibration may be provided to indicate not only the presence of an intruder by the direction of travel as well. As previously alluded, in another embodiment, the monitoring device may be a software application embodied on a wireless mobile device, such as a cellular telephone, whereby a cellular network is utilized to communicate between the apparatus and the wireless mobile device having the software monitoring device application thereon.

FIG. 6 depicts a flow chart illustrating one embodiment of a method for electronic motion detection. Initially, at block 210, one or more electronic monitoring devices are in a standby mode and deployed about an entry zone. At block 212, a possible intruder or target approaches the entry zone. As a result of the proximity of the possible intruder, at block 214, one or more electronic monitoring apparatuses detect a signal and are actuated. At block 216, the detection signals are processed to eliminate false positives. At decision block 218, if the detection signals do not meet a pre-defined threshold, then the detection signals are ignored and the methodology returns to block 210. On the other hand, if the detection signals meet or exceed the pre-determined threshold, then at block 220, detection signals are analyzed with respect to time and the particular point of origin with respect to the double-binocular disparity of each electronic monitoring apparatus.

At decision block 224, depending on if the target is stationary (block 230), moving from a first direction to a second direction with respect to the entry zone (block 226), or moving from a second direction to a first direction with respect to the entry zone (block 228), data is wirelessly communicated to monitoring devices, directly and by repeaters, to alert individuals monitoring the entry zone. As previously mentioned, the alert may be visual, audio and/or tactical (e.g., by way of a vibration). Continuing to decision block 232, if additional detection signals are received then the methodology returns to block 216. If additional detection signals are not received, however, the methodology returns to block 210.

Referring now to FIGS. 7A through 7D, a further embodiment of the electronic monitoring apparatus 14 is illustrated. The housing 44 includes a front 250, top 252, side 254, bottom 256, side 258, and rear 260. The apparatus 14 includes passive infrared sensor clusters 40, 42 mounted in spaced, forward facing positions within the housing 44 at respective recessed windows 270, 272. The passive infrared sensor clusters 40, 42 define respective left and right overlapping fields of view and are set a fixed distance apart and a fixed elevation. In the illustrated embodiment, a front panel plate 274 provides access to the detection circuitry, antenna, and other internal components. A mounting plate 276 is coupled to the rear 260 and configured to provide selective releasable attachment to various surfaces.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. An apparatus for electronic motion detection, the apparatus comprising:
a housing;
first and second sensor clusters mounted in spaced, forward facing positions within the housing, the first and second sensor clusters aligned in the same horizontal plane;
a span adjustment member located within the housing and interposed between the first and second sensor clusters, the adjustment member configured to adjust the horizontal spacing between the first and second sensor clusters, the span adjustment member providing a variable binocular disparity between the first and second sensor clusters;
an elevation adjustment member located within the housing and at least partially supporting the first and second sensor clusters, the elevation adjustment member configured to adjust the elevation of the first and second sensor clusters;
each of the first and second sensor clusters including a left binocular plurality of passive infrared sensors and a right binocular plurality of passive infrared sensors, the left and right binocular pluralities being separated by a fixed distance to provide fixed binocular disparity;
the first and second sensor clusters defining respective left and right overlapping fields of view;
detection circuitry located within the housing, the detection circuitry communicatively disposed with the first and second sensor clusters, the detection circuitry processing respective detection signals relative to an intruder received from the left and right binocular plurality passive infrared sensors of each of the first and second sensor clusters;
the detection circuitry including a memory accessible to a processor, the memory including processor-executable instructions that, when executed cause the processor to:
specify detection validity at a first time, $t_1$, based on the functional values of the detection signals as logical expressions with functional arguments,
specify detection validity at a second time, $t_2$, based on the functional values of the detection signals as logical expressions with functional arguments,
compare detection validity at the first time, $t_1$, and detection validity at the second time, $t_2$, to identify direction of movement, and
specify instructions for indicating the direction of movement;
a display mounted in the housing and communicatively disposed with the detection circuitry, the display for receiving the instructions for indicating the direction of movement and providing a visual indication to classify the intruder as one of moving left to right, right to left, and stationary; and an antenna associated with the housing and positioned in communication with the detection circuitry, the antenna for sending wireless detection signals to a vibrating monitor device, wherein the vibrating monitor device is configured to receive the instructions for indicating the direction of movement and providing a vibratory indication to classify the intruder as one of moving left to right, right to left, and stationary.

2. The apparatus as recited in claim 1, further comprising an antenna associated with the housing and positioned in communication with the detection circuitry, the antenna for sending wireless detection signals to a repeater module.

3. The apparatus as recited in claim 2, wherein the repeater module is configured to receive the instructions for indicating the direction of movement and wirelessly relaying the instructions for indicating the direction of movement.

4. An apparatus for electronic motion detection, the apparatus comprising:

a housing;

first and second sensor clusters mounted in spaced, forward facing positions within the housing, the first and second sensor clusters aligned in the same horizontal plane;

means for adjusting the horizontal spacing between the first and second sensor clusters to provide a variable binocular disparity between the first and second sensor clusters;

means for adjusting the elevation of the first and second sensor clusters;

each of the first and second sensor clusters including a left binocular plurality of passive infrared sensors and a right binocular plurality of passive infrared sensors, the left and right binocular pluralities being separated by a fixed distance to provide fixed binocular disparity;

the first and second sensor clusters defining respective left and right overlapping fields of view;

detection circuitry located within the housing, the detection circuitry communicatively disposed with the first and second sensor clusters, the detection circuitry processing respective detection signals relative to an intruder received from the left and right binocular plurality passive infrared sensors of each of the first and second sensor clusters;

the detection circuitry including a memory accessible to a processor, the memory including processor-executable instructions that, when executed cause the processor to:

specify detection validity at a first time, $t_1$, based on the functional values of the detection signals as logical expressions with functional arguments, specify detection validity at a second time, $t_2$, based on the functional values of the detection signals as logical expressions with functional arguments, compare detection validity at the first time, $t_1$, and detection validity at the second time, $t_2$, to identify direction of movement, and specify instructions for indicating the direction of movement;

a display mounted in the housing and communicatively disposed with the detection circuitry, the display for receiving the instructions for indicating the direction of movement and providing a visual indication to classify the intruder as one of moving left to right, right to left, and stationary; and an antenna associated with the housing and positioned in communication with the detection circuitry, the antenna for sending wireless detection signals to a vibrating monitor device, wherein the vibrating monitor device is configured to receive the instructions for indicating the direction of movement and providing a vibratory indication to classify the intruder as one of moving left to right, right to left, and stationary.

5. The apparatus as recited in claim 4, further comprising an antenna associated with the housing and positioned in communication with the detection circuitry, the antenna for sending wireless detection signals to a repeater module.

6. The apparatus as recited in claim 5, wherein the repeater module is configured to receive the instructions for indicating the direction of movement and wirelessly relaying the instructions for indicating the direction of movement.

* * * * *